| United States Patent [19] | [11] 3,853,498 |
|---|---|
| Bailie | [45] Dec. 10, 1974 |

[54] PRODUCTION OF HIGH ENERGY FUEL GAS FROM MUNICIPAL WASTES

[76] Inventor: Richard C. Bailie, 1323 Cherry Ln., Morgantown, W. Va. 26505

[22] Filed: June 28, 1972

[21] Appl. No.: 267,233

[52] U.S. Cl.................. 48/209, 48/111, 48/197 R, 48/210, 201/2.5, 201/12, 201/31
[51] Int. Cl............................................. C10j 3/12
[58] Field of Search............ 48/197 A, 197 R, 20 E, 48/111, 203, 210; 201/2.5, 12, 31

[56] References Cited
UNITED STATES PATENTS

| 2,557,680 | 6/1951 | Odell | 202/14 |
|---|---|---|---|
| 2,608,526 | 8/1952 | Rex | 201/31 |
| 2,677,603 | 12/1948 | Loon | 48/76 |
| 2,840,462 | 6/1958 | Gorin | 48/197 |
| 3,698,882 | 10/1972 | Garrett et al. | 48/210 |

FOREIGN PATENTS OR APPLICATIONS

| 676,391 | 6/1950 | Great Britain | 48/197 R |
|---|---|---|---|

*Primary Examiner*—S. Leon Bashore
*Assistant Examiner*—Peter F. Kratz
*Attorney, Agent, or Firm*—Bacon & Thomas

[57] ABSTRACT

Municipal waste is converted into high energy fuel gas by pyrolyzing same in a pyrolysis reaction zone, the heat energy required for such endothermic pyrolysis reaction being transferred from an exothermic reaction zone. Both reaction zones comprise a bed of fluidized inert solids, and the heat of pyrolysis is transferred by circulating therebetween the fluidized inert solids.

15 Claims, 5 Drawing Figures

PRODUCTION OF HIGH ENERGY FUEL GAS FROM MUNICIPAL WASTES

BACKGROUND OF THE INVENTION

This invention relates to the conversion of municipal waste into a high energy fuel gas and, more especially, to the conversion of municipal solid waste into a high energy fuel gas using a fluidized bed pyrolysis process and apparatus.

The problem of solid waste disposal has plagued man since antiquiy, and yet even now more than two-thirds of our population is served by inadequate refuse treatment facilities. The solid waste pollution problem has reached extremely alarming proportions. At present, the United States produces seven pounds of solid waste per capita per day. Annually, this amounts to 268 million tons of solid waste production, or over one ton of waste discarded by every man, woman and child. By 1980, some 235 million people are expected to be generating 8 pounds per person per day of solid waste or more than 340 million tons per year. The current annual cost of refuse collection and disposal is well above $4.5 billion, or more than for any other public service except schools, roads, and national defense.

The present methods for disposing of municipal waste are wholly inadequate, and their inadequacy can only increase in the future. Unlike air and water pollution which can be hidden by dilution, man has tried concentration as the solution to the solid waste pollution problem. Over 90 percent of the collected municipal solid waste is disposed of in land fill projects, but what of the highly populated metropolitan areas? These cities dispose of their wastes in lakes, rivers, oceans or pay large transportation costs to move their solid wastes to land fill areas. Another popular solution to solid waste pollution is municipal incineration which disposes of 6 percent of the collected solid wastes. But municipal incineration has a high air and water pollution potential, large capital costs, and high operating costs. Air pollution is in the form of smoke, soot, $SO_2$ and $NO_x$ emissions. Also, there is a residue left that must be disposed of after incineration. Accordingly, it cannot help but be appreciated that the United States (and elsewhere) is on the verge of a solid waste disposal crisis that threatens our environment by potentially increasing air and water pollution. It is, therefore, only too clear that man must find an alternative solution to the solid waste problem.

Moreover, the United States has been fortunate to have had during its technological evolution and revolution ample supplies of low-cost, high-energy fuel. Without these resources, the United States would not have achieved its present position of technological leadership. It will be impossible to continue or maintain this nation's technological level without a continuing source of low-cost plentiful energy.

The energy consumed by this nation results in utilizing fossil fuel resources, and the consumption of these fossil fuels is much faster than they are being generated. Future estimates indicate that the supplies of natural gas will last only 11 more years while oil reserves will last 25 to 30 years, and present coal supplies will last 500 years. The fossil fuel resources are continuing to be depleted without replacement, and it is becoming more difficult, if not dangerous, to borrow from the future. The need is clear. Man must begin to use more wisely his fossil fuel resources.

SUMMARY OF THE INVENTION

Accordingly, it is a primary object of this invention to provide a solution to the solid waste pollution problem.

Another object of this invention is to provide for the return of fractions of solid wastes to economical reuse.

Another object of this invention is to provide a new natural resource of the seven to eight pounds per day per person of the solid waste or, more correctly, the wasted solids, which man is now generating.

Still another object of this invention is to provide an alternative solution to the solid waste problem by uniquely converting same into a readily available, high energy fuel gas that can be used as a substitute for and which can help supplement our diminishing natural gas resources.

Yet another object of the invention is to provide for the conservation of our depleting natural gas reserves.

In attaining the objects of this invention, one feature resides in the gasification of municipal solid wastes (MSW) in fluidized beds, and wherein the municipal refuse is pyrolyzed in a high temperature, e.g., 1500°F., fluidized bed, e.g., fluidized sand bed, in an oxygen-free atmosphere. The hot fluidized material, e.g., the sand, acts as a thermal flywheel in that by circulating between combustion and pyrolysis zones, same supplies the heat of reaction to allow the solid wastes to pyrolyze. Due to the absence of oxygen, the cellulose molecule (a typical analysis shows municipal waste to be over 80 percent carbonaceous matter and over 60 percent cellulosic material) actually "explodes," rather than burns, yielding methane, carbon dioxide, hydrogen, carbon monoxide and water vapor. A by-product of the chemical decomposition is solid activated-carbon char, which is carried out with the pyrolysis gas and which can be used to purify and reclaim liquid and gas streams and/or as fuel for the combustor. The actual pyrolysis gas has many applications: it can be purified for residential or industrial heating and cooking; used directly as fuel for steam production or water desalting; burned in a jet-engine-type turbine for power generation; or serve as a feed-stock for chemical production. See also *Chemical Engineering*, pages 44—46, June 28, 1971.

Objects, features and advantages of this invention will become more apparent from the following description when taken in conjunction with the accompanying drawings, and wherein like reference numerals are used to indicate like or equivalent parts.

DETAILED DESCRIPTION OF THE INVENTION

Figure 1:
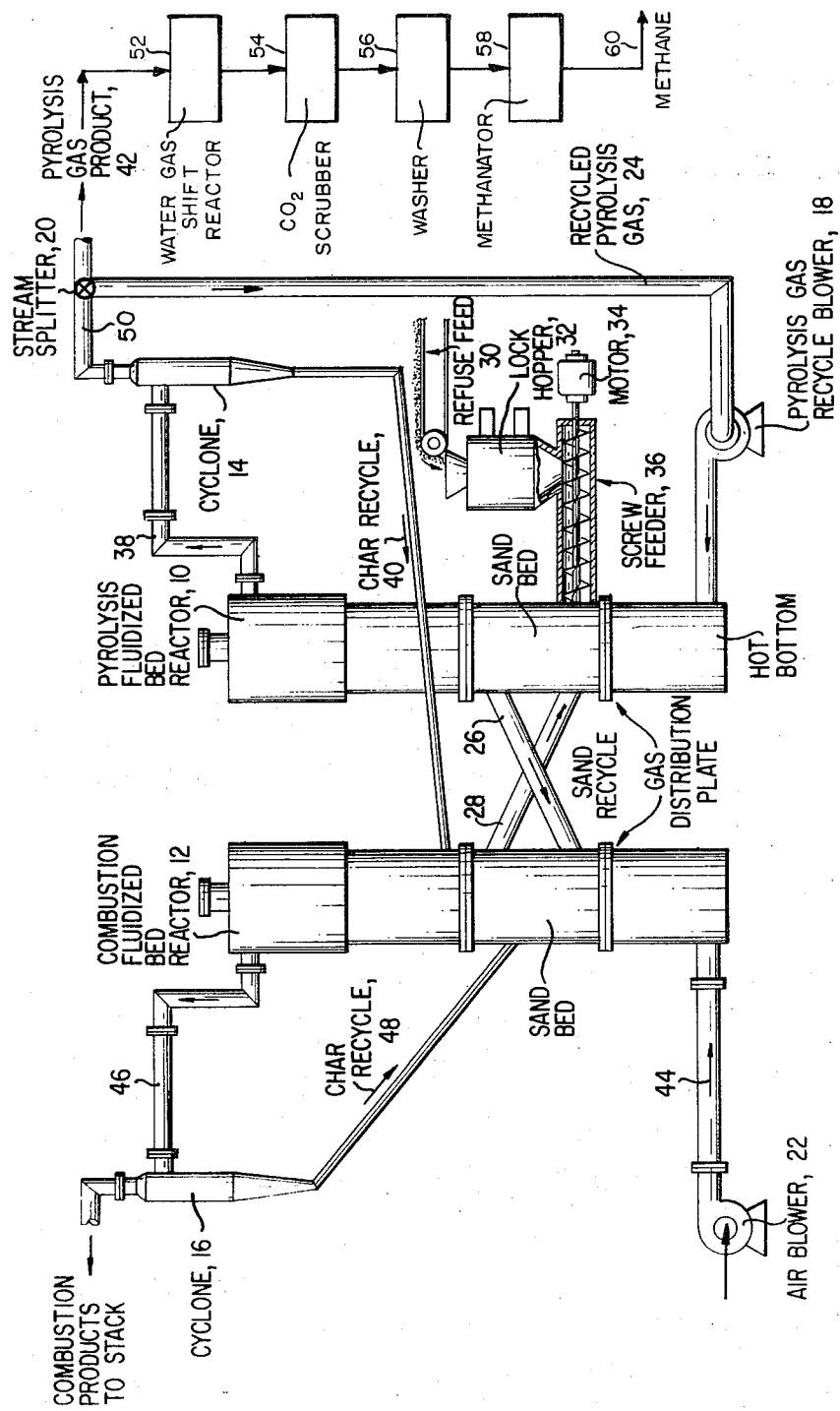
FIG. 1 is a simple schematic of the municipal refuse pyrolysis process of the invention using fluidizing sand recycle and char recycle.

This invention has for its essence the pyrolysis of municipal waste using a fluidized bed gasifier, wherein the heating rate is very rapid and flash pyrolysis is approached. The fluidized bed is advantageously simply a cylinder containing a bed of any suitable inert material to be fluidized, e.g., high silica sand, resting on a gas distribution plate. Compressed gas passes through the distribution plate and into the bed suspending each, for example, solid sand particle. This bed is fluid in the sense that a rock placed on the bed will sink while a piece of wood will float. If an opening is made in the cylinder wall, the fluidized sand will pour out while the unfluidized sand will not. The fluidized bed was first used as a unit operation to gasify solid fuels (brown coal) by Fritz Winkler in Germany in 1926, and near the end of World War II carbonaceous waste materials were gasified by the Winkler process.

Initial investigations were performed using the fluidized bed as a solid waste incinerator. The fluidized bed operates at practically isothermal conditions and any solids introduced into the bed will immediately attain the temperature of the sand. This characteristic allows for rapid and complete combustion of the solid waste particles. The heat of combustion is immediately carried away by the fluidized sand to be used elsewhere in the bed. The fluidized sand thus acts as a thermal flywheel in that it supplies the heat of reaction to allow the solid wastes to burn and then removes the heat of combustion to another area of the bed.

The process of pyrolyzing the municipal refuse, e.g., municipal solid waste, wood waste (e.g., sawdust), agricultural waste, water liquid organics, sewage sludge, etc., according to the invention is conducted in a high temperature fluidized bed, e.g., a 1,300°F. to 1,500°F. sand bed, in an oxygen-free atmosphere. The cellulose molecule is introduced into the bed as municipal refuse and the thermal flywheel effect immediately brings the refuse to 1,300°F.–1,500°F. where the cellulose molecule pyrolyzes. Due to the absence of oxygen in the bed atmosphere, the molecule instead of burning actually "explodes." In this explosion, as in any explosion, the molecule is randomly blown apart. The fragments of the exploded cellulose molecule form ethane, carbon dioxide, hydrogen, carbon monoxide, and a minor proportion of water molecules. Each cellulose molecule introduced into the fluid bed gasifier undergoes this same chemical decomposition. A by-product of the chemical decomposition is solid activated carbon char which is carried out of the fluidized bed with the pyrolysis gas. The gas and char formed from the chemical decomposition of municipal refuse is of prime interest according to the invention as sources of energy recycle to out economic system.

If cellulose is burned in an oxygen-rich atmosphere, as is the case in incineration, carbon dioxide gas and water are produced. This is the lowest or most regressive ecological energy level. Stated differently, this gas can make no positive contribution to our energy resources, and can only be regenerated by the carbon cycle of plant growth and fossilization. However, when the cellulose molecule is "burned" in an oxygen-free atmosphere, the produced pyrolysis gas is, in reference to ultimate resources conservation, ecologically less regressive than the combustion products from incineration. Pyrolysis, an endothermic reaction, converts municipal waste to products with a potentially positive energy contribution rather than to carbon dioxide. Pyrolysis of municipal refuse efficiently in the fluidized bed gasifier of the invention allows recycle of a potentially important source of energy and raw material to our environment, as well as reducing overall pollution of land, air and water.

Several of the major points considered in the pyrolysis of cellulose and solid waste according to the invention can be summarized as follows:

1. Thermal degradation of cellulose is a complicated phenomenon and several theories have been presented to explain the observed reactions. The following illustration represents the general reactions that are considered to be involved in the pyrolysis and the combustion of cellulose:

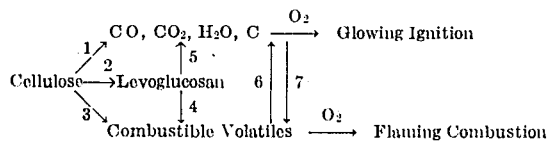

The relative proportion of flammable gases produced varies according to the temperature, time, sample geometry, and the environment of the pyrolyzing cellulose. However, certain general observations can be made.

2. In slow heating, decomposition proceeds according to an orderly arrangement forming increasingly more stable molecules, richer in carbon, and converging toward graphite carbon. In very rapid heating, the molecules are literally torn apart into volatile fractions with almost no possibility of orderly arrangement. Slow pyrolysis at low temperatures yield char and oxygenated gases, and rapid pyrolysis yields flammable gases.

3. In pyrolysis of solid waste, it has been found that the rate of heating is an important consideration, that the yield of fuel gas increased with the heating rate, and that flash pyrolysis would result in a significantly higher yield of energy in the gas phase. Certain experimental techniques employed which did not allow for truly rapid pyrolysis suggested that by proper choice among the process variables higher yields would be attainable. Utilizing temperatures of about 1,500°F., for example, it was noted that the char produced could be further gasified to increase the gas yield.

PROCESS DESCRIPTION

Pyrolysis, of municipal refuse is an endothermic process. It becomes necessary to rapidly heat the refuse to a high temperature and then add enough extra energy to allow chemical decomposition to occur. The process must be accomplished in the absence of oxygen. The process of combustion, for example, at 1,500°F. to 1,800°F., requires the same treatment in the presence of oxygen. The main difference is due to the fact that the combustion reaction is exothermic and the ensuing heat must be efficiently effectively removed. The efficient fluidized bed pyrolysis process according to the invention derives the heat required for chemical decomposition from a fluidized bed combustion unit.

The fluidized bed system according to the invention uses the heat given off by the combustion of pyrolysis char to supply the energy needed in the municipal refuse pyrolysis reaction. The oxygen required for combustion is supplied by compressed air, and in order to prevent the nitrogen in the air from diluting the pyrolysis gas, the two reactions are carried out in separate reaction vessels. Transfer of energy between the two reactors is accomplished in a manner similar to that developed by the petroleum industry in manufacturing high octane gasoline. Each vessel advantageously contains equal depths of fluidized sand particles, and the sand can be induced to flow in known manner from one vessel to another. The sand flow from the combustion reactor at, e.g., 1,750°F. to the pyrolysis reactor at, e.g., 1,500°F. supplies the heat necessary for the chemical decomposition of municipal refuse to occur. The solid feed to the pyrolysis unit is municipal refuse, while that to the combustion unit is the solid char formed from the municipal refuse pyrolysis reaction. The high heat transfer rate and isothermal conditions of the fluidized bed have been found to be exceedingly desirable for fuel gas production. A minor amount (about 3%) of low molecular weight liquid is additionally formed in the pyrolysis zone.

Referring particularly to FIG. 1, the apparatus for the conversion of municipal waste into a high energy fuel gas according to the invention comprises two fluid-bed reactors, a pyrolysis fluidized bed reactor 10 and a combustion fluidized bed reactor 12; two solid separators or cyclones 14 and 16; a pyrolysis recycle blower 18; and a stream splitter 20. The reactors 10 and 12 are of fluidized bed type and are operated at elevation temperatures, and utilize the typical inert particulate solids as the fluidizing media. Fluidized bed reactor 12 operates advantageously at a temperature between about 1,500°F. and 1,800°F. as a combustion unit and is fluidized with air provided by the air blower 22. Fluidized bed reactor 10 operates advantageously at a temperature between about 1,300°F. and 1,500°F. as a pyrolyzer unit in the absence of oxygen and is fluidized with recycled pyrolysis gas 24. The combustion reaction taking place in the fluidized bed reactor 12 is an energy source and the heat of combustion is immediately transferred to the inert fluidizing material being recycled into the reactor 12 via line 26. The, e.g., hot sand, exiting the reactor 12 via line 28 and hence entering the reactor 10 provides the energy required for the pyrolysis reaction being conducted in the said fluidized bed reactor 10. Municipal solid waste or refuse feed 30, desirably but not necessarily dried and freed of its metals, cans and glass content, and desirably comminuted to particle sizes of less than about two inches, is introduced into the pyrolysis fluidized bed reactor 10 by means of lock hopper 32, motor 34 and screw feeder 36. This solid refuse feed 30 is thermally decomposed in the reactor 10 to form gas-solid char-ash. The gas thus formed, together with the fluidizing gas, exit the reactor 10 via line 38. Such gas has entrained therein solid particles of ash and char, and these solids are separated from the said gas in the cyclone 14. The gaseous components exit the cyclone 14 via the line 50, whereas the solids are "recycled" to the combustion fluidized bed reactor 12 by means of char recycle line 40. The said gas exiting the cyclone 14 is split with stream splitter 20, a portion being recycled via recycled pyrolysis gas line 24 and by pyrolysis gas recycle blower 18 into the bottom of the reactor 10; and the remaining portion of such gas constitutes the fuel or pyrolysis gas product 42. The fuel for the combustion fluidized bed reactor 12 is char and this char is fed to such reactor from the cyclone 14 through char recycle 40; similarly, the inert materials exiting the reactor 10 enter the reactor 12 through the sand recycle line 26. The air required for the combustion reaction is supplied along line 44 by air blower 22. Combustion products exit the reactor 12 via line 46, together with any entrained solids, which solids are separated in the cyclone 16 with the combustion products exiting to stack and the char being recycled via line 48 to the combustion fluidized bed reactor 12. It will be appreciated that the fluidized sand thus acts as a thermal flywheel in that it supplies the heat of reaction to permit the solid wastes to burn and then removes the heat of combustion to another area of the bed.

Moreover, it too will be appreciated that (1) as any hydrogen gas is stripped out in the pyrolyzer 10, this hydrogen does not have an opportunity to combine with oxygen in air to form water; (2) the fuel gas product is not diluted with nitrogen from the air; (3) the system is thermally balanced and requires no energy addition or removal; and (4) the inert particles which take no part in the several chemical reactions are used to establish fluidization characteristics in each bed (thus allowing for heterogeneous feed size that is not itself capable of fluidization to be used). Similarly, the inert particles are used to transport energy to the pyrolyzing zone, wherein fluidization is maintained by recycle gas; the high heat transfer rates provided by such fluidized inert particles affording the high gas yields, and the fuel gas product is of course not diluted by nitrogen from air, and, additionally, the fuel for combustor 12 is char from pyrolyzer 10 with most of the hydrogen removed.

EXPERIMENTAL GAS PRODUCTION RESULTS

Figure 2:
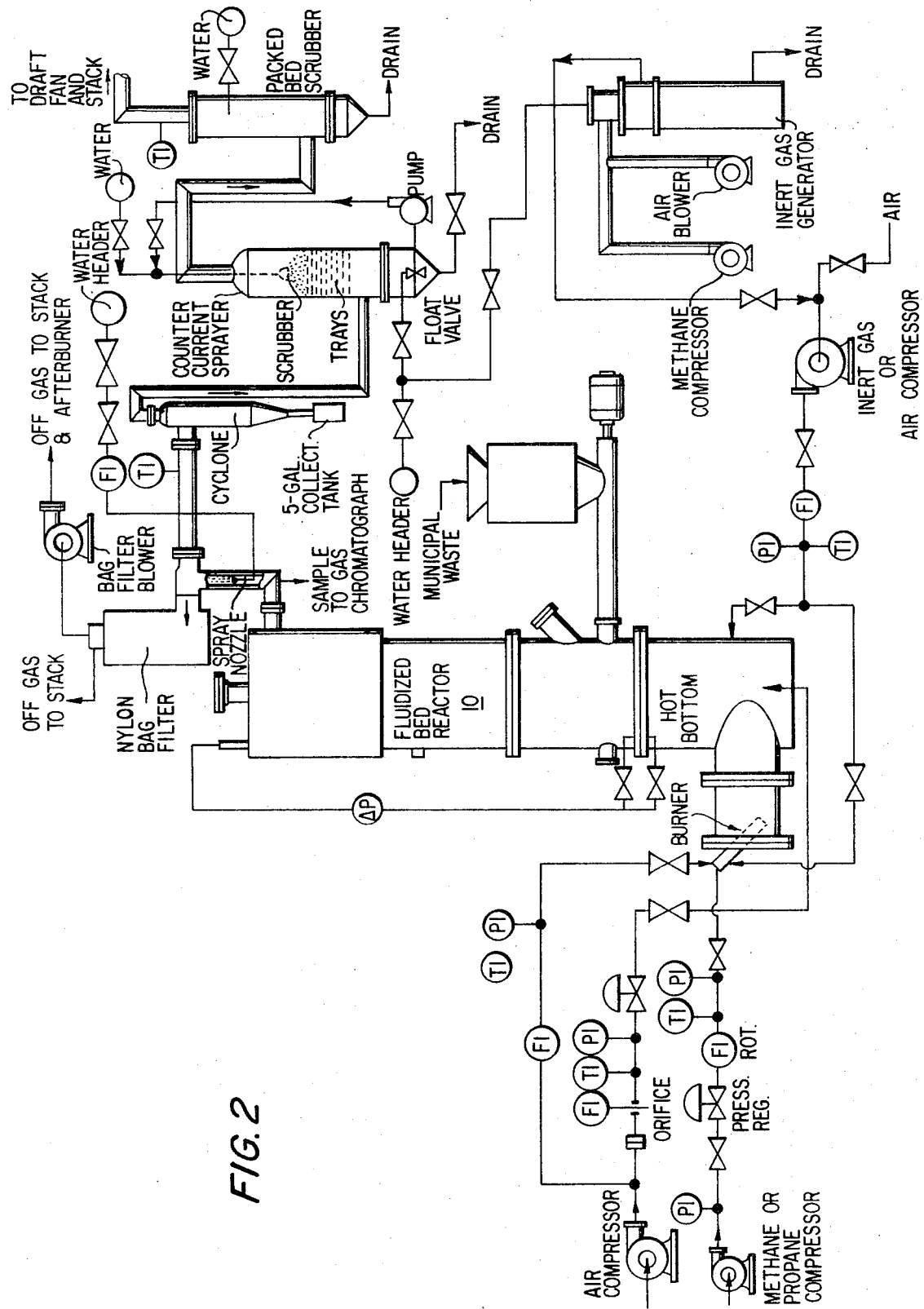
FIG. 2 is a flowsheet for the fluidized bed pyrolysis reactor utilized in the invention.

The following is a description of certain experimental results obtained from fluidized bed pyrolysis of municipal refuse. The tests were conducted using the atmospheric pilot plant fluidized bed gasifier equipment illustrated in FIG. 2. Results therefrom are presented in Table I. The pyrolysis gas could conceivably be treated through a $CO_2$ scrubber, CO shift reactor and/or methanation process to raise the heating value to that of natural gas (see Table III).

In Table II are presented the characteristics of the fuel gas produced by the Koppers Totzek process, the Lurgi process, and solid waste fluidized bed pyrolysis system. Also, the energy recovery from the solid waste fluidized bed pyrolysis process is about 70 percent while that for the Koppers Totzek and Lurgi process is between 60 and 65 percent. By way of background, the conversion of fossil fuels into fuel gas or pipeline gas is presently accomplished by complex processes. These processes operate at high temperatures and pressures, require large numbers of skilled personnel and demand large capital investments. Two such processes which are considered economical to operate in Europe and Asia are the aforesaid Lurgi process and the Koppers Totzek process. The Lurgi process requires high pressure, pure oxygen, and steam to gasify coal. The Koppers Totzek process operates at 900°C. with moderate pressure, and requires steam and 98.5 percent pure oxygen to gasify lignite. Both of these processes require a steam generation plant, as well as an oxygen producing facility. Thus, capital and operating costs are high, but yet it is economic for these plants to produce fuel gas. The gas produced from these processes is not equivalent to natural gas, but it is compressed and pumped as far as 200 miles in pipelines for industrial and domestic use. The fuel gas produced has a heating value of less than half that of natural gas. The economic success of these processes lies chiefly in the fact that Europe and Asia do not process large supplies of natural gas. This is not the case in this country, but as heretofore mentioned, our resources of natural gas will only last an estimated 11 years.

Examining Table III clearly evidences that the gas produced by the fluidized bed pyrolysis process is superior to that produced by either of the other processes. The heating value of the gas produced by the fluidization method is considerably higher than either of the other processes. The Koppers Totzek and Lurgi processes require high pressure, coal or lignite, steam, and pure oxygen. The fluidized bed process of the invention uses atmospheric pressure, air, and municipal refuse. Refuse pyrolysis produces better gas, conserves the fossil fuel and natural gas resources, and helps solve the solid waste pollution problem.

inches. Combustor 12 will be fed the recycled char 40 produced in the gasifier unit at a rate of 31,500 pounds per day and will operate at 1,750°F. This bed will operate at three times the minimum fluidization velocity using 2.1 MMSCF/DAY of air. Off gas the combustor 12 will pass through two cyclones 16 to effect gas cleanup. The first cyclone will remove large solid particles while the second will remove the smaller particles. Char 48 removed from the cyclones 16 will be returned to the combustor 12 for fuel. Combustion products will then be passed through a heat exchanger to preheat the air entering the combustor 12 for heat conservation.

Pyrolysis fluidized bed reactor 10 will be 15 feet in diameter with an overall height of 20 feet. The bed height and sand harmonic mean diameter are the same as for the combustor 12. The pyrolysis unit will operate at 1,500°F. and will gasify 400 tons per day of municipal refuse. Gas used to fluidize the pyrolysis unit will be supplied by recycling the pyrolysis gas. One-third of the gas produced will be recycled and the bed will operate at three times the minimum fluidized velocity. The pyrolysis gas stream will pass into a cyclone 14 to remove the product of activated carbon char produced in the pyrolysis reaction. This char is fed via line 40 to the combustion unit 12 to supply the heat necessary to keep the fluidized sand temperature at 1,750°F. The off gas may be passed through an optional processing sys-

TABLE I

PYROLYSIS OF MUNICIPAL REFUSE TESTS RESULTS

| Component | Proximate Municipal Refuse Analysis | Proximate Activated Char Analysis | Gas Production SCF/LB Solid Fed (Dry Basis) | Dry Gas Composition (Vol.%) | Dry Gas Composition ($CO_2$ Free) |
|---|---|---|---|---|---|
| $CO_2$ | | | 1.40 | 16.3 | 0.0 |
| CO | | | 3.04 | 35.5 | 42.4 |
| $CH_4$ | | | 0.95 | 11.1 | 13.3 |
| $H_2$ | 3.56 | 2.95 | 3.18 | 37.1 | 44.3 |
| Carbon | 25.15 | 60.82 | | | |
| Heating Value BTU/SCF Dry | | | | 366 | 437 |

TABLE II

COMPARISON OF THE KOPPERS TOTZEK AND LURGI PROCESSES TO THE FLUIDIZED BED PYROLYSIS OF SOLID WASTE

| | Koppers Totzek Process | Lurgi Process | Fluidized Bed Process |
|---|---|---|---|
| SOLID FED | LIGNITE | COAL | SOLID WASTE |
| $CO_2$ (Vol. %) | 14.8 | 25.6 | 16.3 |
| $O_2$ | 0.4 | 0.0 | 0.0 |
| CO | 46.2 | 24.4 | 35.50 |
| $H_2$ | 31.9 | 37.3 | 37.10 |
| $CH_4$ | 2.5 | 10.3 | 11.10 |
| $N_2$ | 4.2 | 1.8 | 0.0 |
| Unsaturated Hydrocarbons | 0.0 | 0.6 | — |
| Heating Value, BTU/SCF Dry | 210 | 312 | 366 |

FOUR HUNDRED TON PER DAY FACILITY

Figure 3:
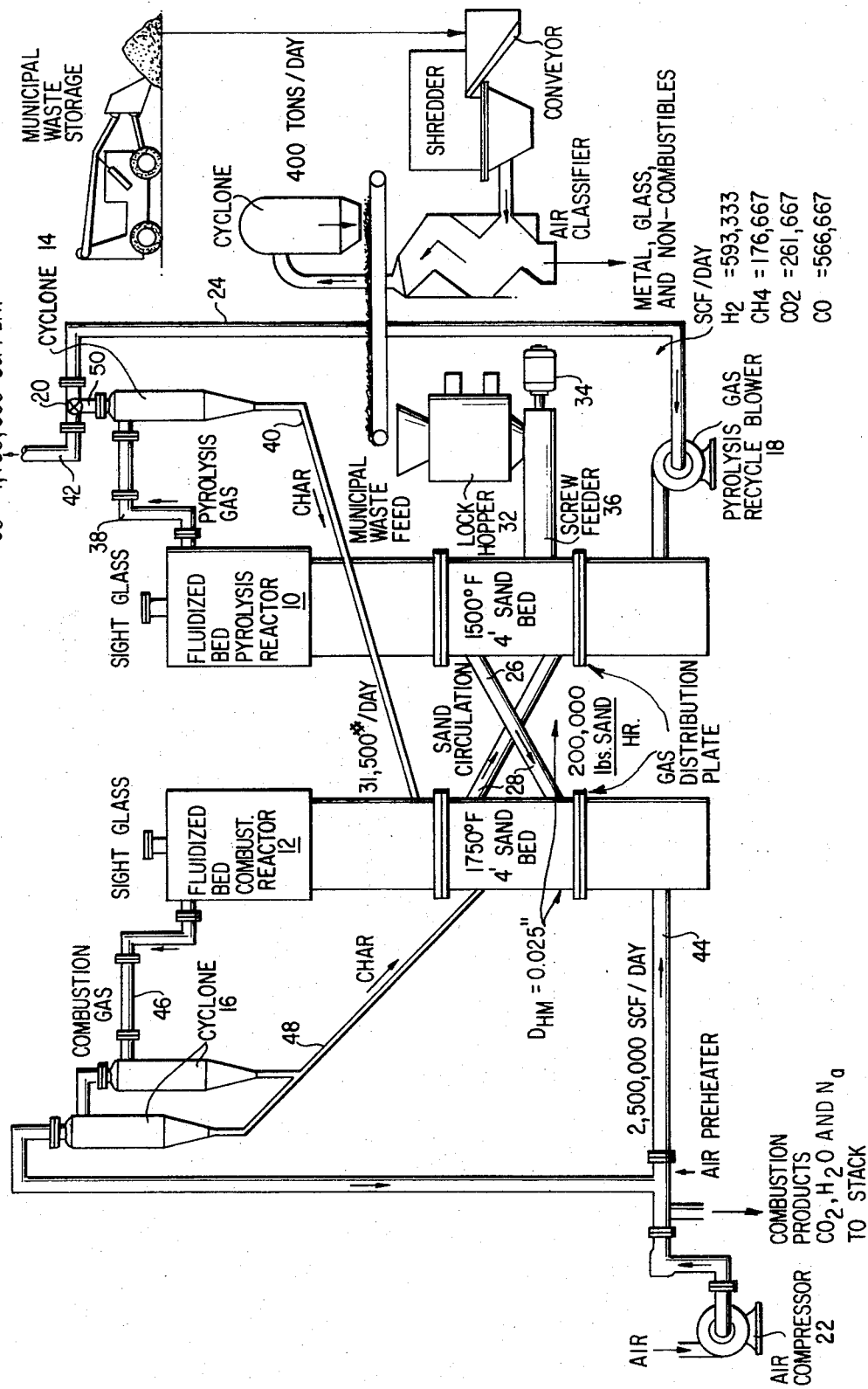
FIG. 3 is an overall schematic of a 400 ton per day municipal waste pyrolysis facility according to the invention.

The following is a description of the equipment used to process 400 tons per day of municipal refuse which has an average moisture content of 30 percent. The schematic of the entire municipal refuse fluidized bed pyrolysis system according to the invention is shown in FIG. 3.

The combustion unit 12 is a fluidized bed 7.0 feet in diameter and 20 feet high. The sand bed height is 4 feet with a harmonic mean particle diameter of 0.025 inches.

tem. The gas could go through a water gas shift reactor 52, a carbon dioxide scrubber 54, a cleanup washer 56; and finally, a methanator 58 to convert all the pyrolysis gas to methane 60. This system is purely optional as the gas coming directly from the pyrolysis unit is an immediately usable energy source. Energy required to maintain the pyrolysis unit 10 at 1,500°F. is obtained from the sand circulating from the combustion unit 12 at 1,750°F. The sand circulation rate is approximately 54,000 pounds of sand per hour.

The refuse feed system bears some mention. This system consists of a refuse storage pit from which the refuse is removed as needed and fed to the conveyor belt by a mechanical lift. The refuse is passed to a sophisticated refuse shredder where the municipal refuse is reduced in size. The refuse is passed through an air classifier where 90 percent of the metal, glass and heavy objects are removed. Such classified refuse is then fed by conveyor to a lock hopper 32-screw feeder 36 apparatus where the refuse is fed directly into the fluidized bed.

Amounts of pyrolysis gas at different steps in the final gas processing are shown in Table III on a dry basis.

TABLE III

PYROLYSIS GAS PRODUCED FROM 400 TONS PER DAY OF MUNICIPAL REFUSE*

| Component | Pyrolyzer Exit SCF/DAY (Dry Basis) | Co-Shift Exit SCF/DAY (Dry Basis) | $CO_2$ Scrubber Exit SCF/DAY (Dry Basis) | Methanator Exit SCF/DAY (Dry Basis) |
|---|---|---|---|---|
| $CO_2$ | 785,000 | 1,610,000 | — | — |
| CO | 1,700,000 | 870,000 | 870,000 | — |
| $CH_4$ | 530,000 | 530,000 | 530,000 | 1,400,000 |
| $H_2$ | 1,780,000 | 2,610,000 | 2,610,000 | — |
| TOTAL | 4,795,000 | 5,620,000 | 4,010,000 | 1,400,000 |

*Municipal refuse contains on the average 30 percent moisture.

Four hundred tons per day of municipal refuse would be produced by a city of approximately 100,000 people. The average daily residential consumption of natural gas per capita is 150 SCF (dry). It can thus be seen from Table I that on a per capita basis per day 23 SCF of equivalent natural gas is produced from the pyrolysis unit. Thus, if all the minicipal refuse produced per person per day were to be pyrolyzed by the fluidized bed method of the invention, approximately 15 percent of the daily natural gas requirement per person could be supplied. This amount of natural gas generation would substantially subsidize the daily natural gas requirements of the United States. Consequently, the subject invention helps solve the solid waste pollution problem, conserves our fossil fuel natural resources, and reduces potential air and water pollution.

Figure 4:
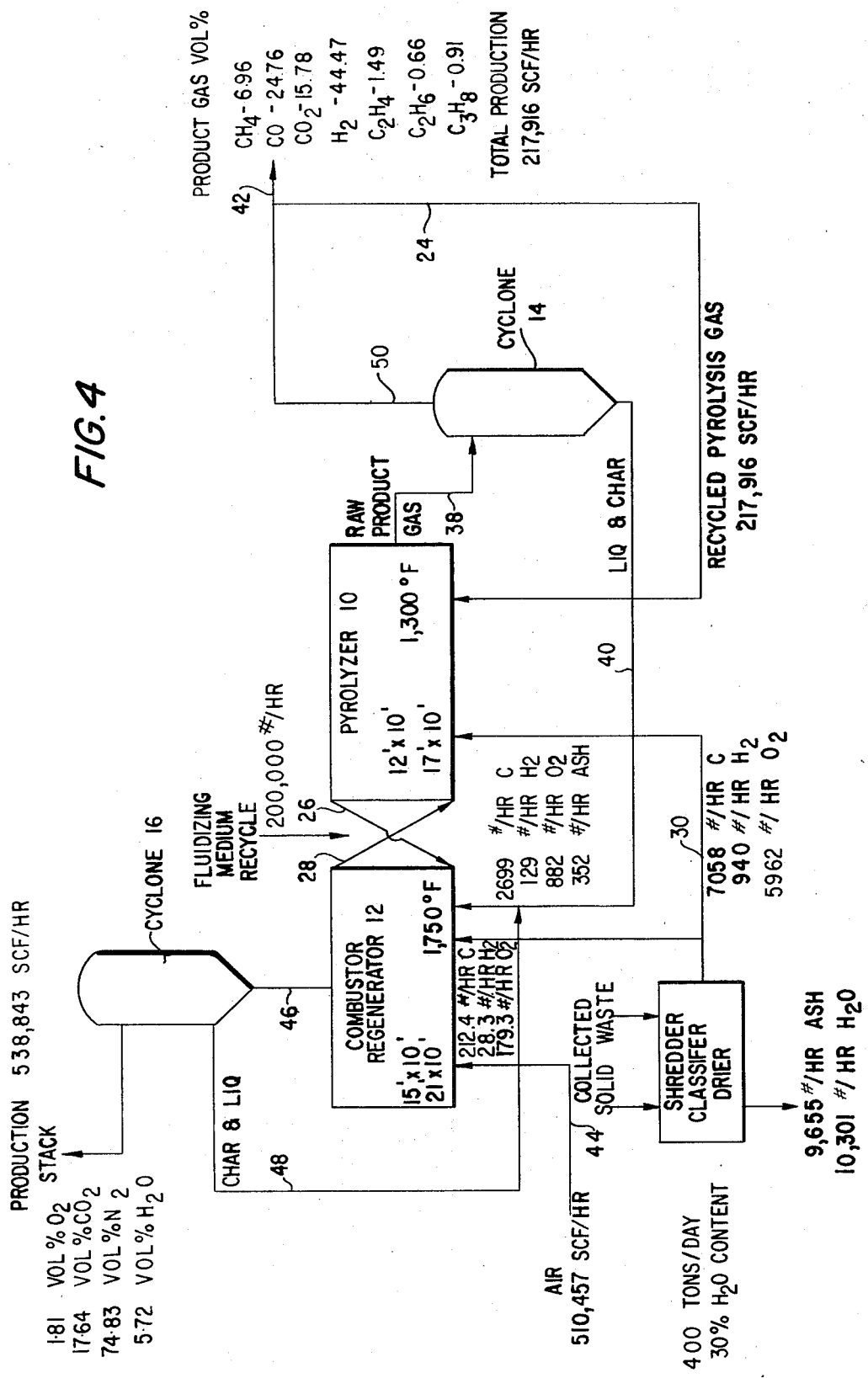
FIG. 4 is a schematic of another 400 ton per day municipal waste pyrolysis facility according to the invention and reflects certain process data obtained during the reactions cycle.
Figure 5:
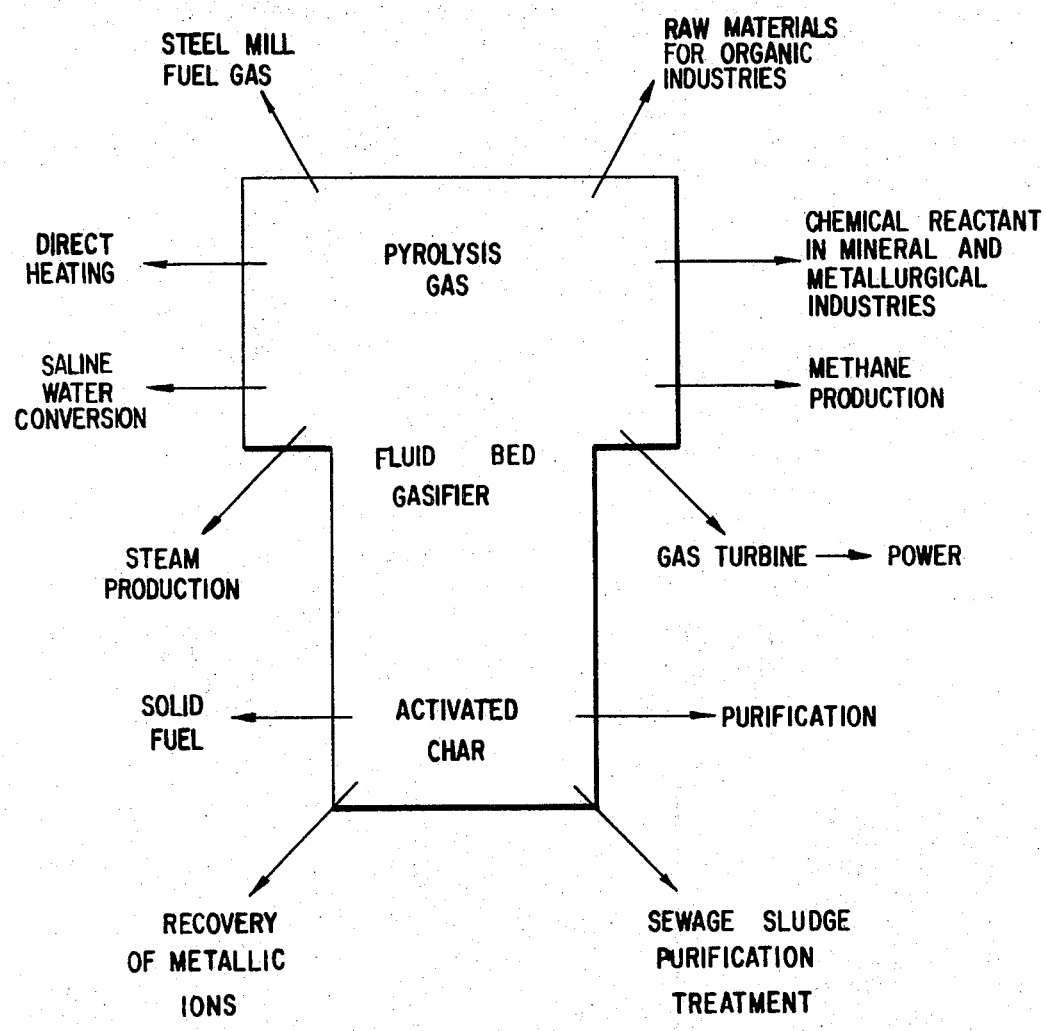
FIG. 5 is a simplified illustration of possible uses of the gas and char products from the pyrolysis of municipal refuse according to the invention.

In another 400 ton per day facility according to the invention, as illustrated in the schematic of FIG. 4, the 400 tons per day of MSW (having a moisture content of 30 percent by weight) are pretreated, prior to feeding the pyrolysis reactor, by drying, removing the metal, cans and glass content and then by sizing the MSW to a particle size of less than about two inches. The feed to the pyrolysis reactor 10 is assumed to be bone dry and ash-free, and on this basis the feed to pyrolysis reactor 10 is:

| Carbon | | 7,058 lb./hr. |
|---|---|---|
| Hydrogen | | 940 lb./hr. |
| Oxygen | | 5,962 lb./hr. |
| | Total | 13,960 lb. dry, ash-free MSW/hr. |

The feed rate of 13,960 pounds of dry, ash-free MSW to pyrolysis reactor 10 produces the following materials:

CHAR:

| Carbon | | 1,927 lb./hr. |
|---|---|---|
| Hydrogen | | 94 lb./hr. |
| Oxygen | | 796 lb./hr. |
| Ash | | 352 lb./hr. |
| | Total | 3,169 lb. dry char/hr. |

LIQUID:

| Carbon | | 772 lb./hr. |
|---|---|---|
| Hydrogen | | 35 lb./hr. |
| Oxygen | | 86 lb./hr. |
| | Total | 893 lb. liquid/hr. |

PYROLYSIS GAS:

| Carbon | | 4,359 lb./hr. |
|---|---|---|
| Hydrogen | | 811 lb./hr. |
| Oxygen | | 5,080 lb./hr. |
| | Total | 10,250 lb. pyrolysis gas/hr. |

The total output of 10,250 lb. pyrolysis gas per hour can be represented equally as well as 217,916 SCF/hr. (average MW = 18.19 lb./lb. mole).

The fluidized bed pyrolysis reactor 10 of the instant facility comprises a fluid bed section 10 feet high and 12 feet in diameter, the freeboard being 17 feet in diameter and also 10 feet high; and the sand circulation rate is 7.1 pounds of sand circulated per pound of dry ash-free municipal solid waste fed to the said pyrolysis reactor 10. This amount of sand circulation facilitates completely circulating the entire four foot pyrolysis sand bed (45,200 pounds of sand) 2.19 times per hour or approximately one bed change every 27.3 minutes. If a 6 foot settled sand bed is used (68,000 pounds of sand), the number of bed changes per hour drops to 1.46, or approximately one bed change every 47.1 minutes.

Additionally, the pyrolysis reactor 10 is equipped with a continuous ash removal pipe, advantageously in the form of a cone gas distribution plate with a center pipe and lock hopper, to remove any ash that might get into the system.

Calculating the energy balance around the pyrolysis reactor 10, it will be seen that the amount of energy required by the said pyrolysis reactor 10 and thus that which must be supplied by the combustion reactor 12 is 21,374,504 BTU/hr. This is supplied by burning the char and liquid pyrolysis products and bone dry, ash-free MSW. The energy balance around the combustion reactor 12 is facilitated on the assumptions that: (1) the combustion reactor 12 is operated at 1,750°F., while the pyrolysis reactor 10 is operated at 1,300°F.; (2) the products of combustion exit the reactor 12 at 1,750°F.; (3) the MSW and air feeds are bone dry and ash-free at a 77°F. introduction temperature; (4) there is no heat loss in the sand recycle lines; (5) the char enters at 1,300°F. and the liquid at 700°F., as a vapor; (6) the combustion reactor 12 operates at ten percent excess air; and (7) the ash from the combustion of the char remains in the combustion unit and has the same heat capacity as sand.

The amount of additional MSW that should be fed to the combustor 12 to supply that amount of energy required by the pyrolysis reactor 10 and that cannot be supplied by burning the char and liquid, is approximately 420 pounds per hour of MSW on a dry ash-free basis.

The combustion product gas and inlet air rate are calculated from the incoming solids and liquid composition, the said incoming char and liquid compositions and rates thereof being hertofore supplied. The 420 pounds per hour of dry ash-free MSW contains 212.4 pounds of carbon, 28.3 pounds of hydrogen, and 179.3 pounds of oxygen, all per hour.

The combustion reactions are:

$C + O_2 \rightarrow CO_2$ $H_2 + \frac{1}{2} O_2 \rightarrow H_2O$ and the amount of oxygen required to burn all solids and liquid is 248.7 moles per hour, and utilizing a 10 percent air excess this figure becomes 273.6 moles $O_2$ per hour or 107,196 SCF per hour. This requires 510,457 SCF per hour of air.

The combustion product gas, therefore, exhibits the following composition:

| | | |
|---|---|---|
| $CO_2$ | | 95,051 SCF/hr. |
| $H_2O$ | | 30,795 SCF/hr. |
| $O_2$ | | 9,756 SCF/hr. |
| $N_2$ | | 403,241 SCF/hr. |
| | Total | 538,843 SCF/hr. |

Dimensions of the fluidized bed combustion reactor 12 are based on maintaining a fluidization velocity of 3.5 feet per second to match that of the pyrolysis reactor 10. The air flow rate is 510,457 SCF per hour, but increases to 538,843 SCF per hour of combustion products. The design rate is 2,217,608 SCF per hour at the combustor 12 conditions of 1,750°F. The aforesaid parameters dictate that the combustor 12 be 15 feet in diameter and 10 feet high, with a 21 foot diameter freeboard, also 10 feet high (allowing a 4 to 6 foot sand bed).

The amount of sand contained in the reactor 12 is 70,686 pounds; and the sand circulation rate dictates 1.40 bed changes per hour or approximately one bed change every 42.7 minutes.

UTILIZATION OF PYROLYSIS GAS

The actual pyrolysis gas from the fluidized bed according to the invention has many direct applications including direct production of methane as above described. This gas can be used in residential areas for heating and cooking, and for heating in steel mills. Other direct uses of this gas are for saline water conversion and steam production. Additionally, the gases could be burned in a jet engine type turbine for power generation. The pyrolysis gas could be used as a raw material in organic industries, as well as in mineral and metallurgical industries.

The activated char produced by pyrolysis is also a valuable product. This char can be used directly as a solid fuel to perform some of the tasks of the pyrolysis gas mentioned above. Such char can be used for general purification and reclamation of liquid and gas streams. In particular, the char could be used to purify sewage sludge to obtain pure water and then the solids could be used as the energy source for the fluidized bed combustion unit. The activated char could be used to absorb metallic ions. The char could also be used for the fuel for the fluidized bed combustion unit and could be circulated with the sand.

These processes are shown schematically in FIG. 4.

The invention thus provides that municipal refuse can be converted into fuel gas with a relatively high heating value. It has also been demonstrated that pyrolysis in a fluidized bed results in high gas yields with high thermal efficiency.

While there have been shown and described and pointed out the fundamental novel features of the invention as applied to certain preferred embodiments, those skilled in the art will appreciate that various modifications, changes, and omissions in the conversion of municipal waste into a high energy fuel illustrated and described can be made without departing from the spirit of the invention. It is the intention, therefore, to be limited only by the scope of the following claims.

What is claimed:

1. A method for the gasification of municipal waste to produce high energy fuel gas, which method comprises:
    i. pyrolyzing a municipal waste feed, in an inert, oxygen-free atmosphere, in an endothermic pyrolysis reaction zone to thus gasify the same in the absence of substantial byproduction of liquid reaction products;
    ii. the said pyrolysis reaction zone comprising a dense bed of fluidized, inert particulate solids;
    iii. said pyrolysis reaction operating under essentially isothermal conditions;
    iv. the heat energy required for said pyrolysis reaction being generated by exothermic combustion reaction in a distinct, exothermic combustion reaction zone;
    v. said exothermic combustion reaction zone also comprising a bed of inert particulate solids;
    vi. the fluidized, inert particulate solids in said endothermic pyrolysis reaction zone being in communicating relationship with the inert particulate solids in said exothermic combustion reaction zone;
    vii. said generated heat of exothermic combustion reaction being transferred to said endothermic pyrolysis reaction zone to provide the said heat energy requirements thereof, without substantial transference of either reactants for or reaction products of said exothermic combustion reaction, by circulating the respective inert particulate solids between the said exothermic combustion reaction zone and the said endothermic pyrolysis reaction zone; and
    viii. whereby the pyrolysis gas product comprises the high energy fuel gas.

2. The method as defined by claim 1, wherein flash pyrolysis is approached in the said endothermic pyrolysis reacton zone.

3. The method as defined by claim 2, wherein the bed of inert particulate solids comprising the exothermic combustion reacton zone is a fluidized bed.

4. The method as defined by claim 3, wherein a portion of the pyrolysis gas product is recycled to the endothermic pyrolysis reacton zone.

5. The method as defined by claim 4, wherein the said recycled pyrolysis gas product is utilized to fluidize the inert particulate solids comprising the said endothermic pyrolysis reacton zone.

6. The method as defined by claim 5, wherein solid activated carbon char is produced as a by-product of the said endothermic pyrolysis reacton.

7. The method as defined by claim 6, wherein the said by-produced solid activated carbon char is recycled to the exothermic combustion reacton zone.

8. The method as defined by claim 7, wherein the said recycled, by-produced solid activated carbon char fuels the said exothermic combustion reaction.

9. The method as defined by claim 8, wherein air is injected into said exothermic combustion reaction zone to fluidize the inert particulate solids comprising the same.

10. The method as defined by claim 9, wherein any char comprising the products of combustion is recycled to the said exothermic combustion reaction zone.

11. The method as defined by claim 10, wherein the said pyrolysis gas product is treated through a water gas shift reactor, a carbon dioxide scrubber, a cleanup washer and a methanator.

12. The method as defined by claim 10, wherein the inert particulate solids comprising the endothermic pyrolysis reaction zone and the exothermic combustion reaction zone comprise a high silica sand, wherein the said endothermic pyrolysis reaction is conducted at a temperature of from about 1,300° to 1,500°F., and wherein the said exothermic combustion reaction is conducted at a temperature of from about 1,500° to 1,800°F.

13. The method as defined by claim 10, wherein the municipal waste feed pyrolyzed is selected from the group consisting of municipal solid wastes, wood wastes, agricultural wastes, waste liquid organics and sewage sludge.

14. The method as defined by claim 13, wherein the municipal waste feed is comminuted to a particle size of less than about 2 inches, and is bone-dry and ash-free.

15. The method as defined by claim 10, wherein hydrogen gas is stripped from the said endothermic pyrolysis reaction zone.

* * * * *